United States Patent
Chhillar et al.

(10) Patent No.: US 11,991,071 B2
(45) Date of Patent: May 21, 2024

(54) NETWORK ROUTING COMPUTATION FOR COMPLETING PARTIALLY-CONFIGURED ROUTE

(71) Applicant: Ciena Corporation, Hanover, MD (US)

(72) Inventors: Mohit Chhillar, Gurugram (IN); Preeti Singh, Gurugram (IN)

(73) Assignee: Ciena Corporation, Hanover, MD (US)

( * ) Notice: Subject to any disclaimer, the term of this patent is extended or adjusted under 35 U.S.C. 154(b) by 274 days.

(21) Appl. No.: 17/518,679

(22) Filed: Nov. 4, 2021

(65) Prior Publication Data

US 2023/0092418 A1    Mar. 23, 2023

(30) Foreign Application Priority Data

Sep. 22, 2021 (IN) .............................. 202111042950

(51) Int. Cl.
    *H04L 45/28*      (2022.01)
    *H04L 41/0659*    (2022.01)
    *H04L 45/00*      (2022.01)

(52) U.S. Cl.
    CPC .......... *H04L 45/28* (2013.01); *H04L 41/0659* (2013.01); *H04L 45/22* (2013.01)

(58) Field of Classification Search
    CPC ...... H04L 45/28; H04L 41/0659; H04L 45/22
    See application file for complete search history.

(56) References Cited

U.S. PATENT DOCUMENTS

| | | | |
|---|---|---|---|
| 8,682,160 B2 | 3/2014 | Prakash et al. | |
| 8,818,198 B2 | 8/2014 | Trnkus et al. | |
| 8,854,955 B2 | 10/2014 | Prakash et al. | |
| 9,054,831 B2 | 6/2015 | Prakash et al. | |
| 9,118,421 B2 | 8/2015 | Swinkels et al. | |
| 9,172,658 B2 | 10/2015 | Kakkar et al. | |
| 9,236,953 B2 | 1/2016 | Chhillar et al. | |
| 9,407,359 B2 | 8/2016 | Swinkels et al. | |
| 9,485,550 B2 | 11/2016 | Chhillar et al. | |
| 9,485,551 B2 | 11/2016 | Prakash et al. | |
| 9,538,264 B2 | 1/2017 | Surek et al. | |
| 9,628,172 B2 | 4/2017 | Prakash et al. | |
| 9,800,522 B2 | 10/2017 | Chhillar et al. | |
| 9,985,724 B2 | 5/2018 | Prakash et al. | |
| 10,038,495 B2 | 7/2018 | Prakash et al. | |
| 10,097,306 B1 | 10/2018 | Chhillar et al. | |

(Continued)

FOREIGN PATENT DOCUMENTS

| EP | 2 963 852 B1 | 8/2019 |
|---|---|---|
| EP | 3 051 725 B1 | 4/2020 |

*Primary Examiner* — Donald L Mills
(74) *Attorney, Agent, or Firm* — Baratta Law PLLC; Lawrence A. Baratta, Jr.

(57) ABSTRACT

Systems and methods for computing paths through a network are provided. A method, according to one implementation, includes the step of receiving information regarding a path through a network from a source node via one or more intermediate nodes to a destination node, whereby the path is loosely defined by a user as a partially-completed route through the network using one or more network resources. The method also includes the step of utilizing the information regarding the path to automatically compute a completed home route from the source node to the destination node while attempting to retain as many of the one or more intermediate nodes of the path as possible.

20 Claims, 5 Drawing Sheets

(56) References Cited

U.S. PATENT DOCUMENTS

| | | |
|---|---|---|
| 10,110,438 B2 | 10/2018 | Prakash et al. |
| 10,148,551 B1* | 12/2018 | Wood ...................... H04L 41/12 |
| 10,187,144 B2 | 1/2019 | Prakash et al. |
| 10,187,152 B2 | 1/2019 | Prakash et al. |
| 10,298,488 B1* | 5/2019 | Wood ...................... H04L 45/22 |
| 10,411,806 B2 | 9/2019 | Prakash et al. |
| 10,536,216 B1 | 1/2020 | Chhillar et al. |
| 2015/0207724 A1* | 7/2015 | Choudhury ............. H04L 45/42 |
| | | 370/255 |
| 2022/0006726 A1* | 1/2022 | Michael .............. H04L 43/0876 |

* cited by examiner

NETWORK ROUTING COMPUTATION FOR COMPLETING PARTIALLY-CONFIGURED ROUTE

TECHNICAL FIELD

The present disclosure generally relates to networking systems and methods. More particularly, the present disclosure relates to path computation for computing home routes and modified home routes in a network and by completing partially-completed, user-configured routes.

BACKGROUND

Currently, route validation systems employed in the control plane of a network normally enforce strict explicit routing strategies based on the nodes and links in user-provisioned routes. If any node/link is found missing or incomplete, the route validation systems may fail these user routes, instead of attempting to find an alternate route for these missing or incomplete nodes/links similar to protection path provisioning. Conventional systems do not normally provide an option to automatically complete and validate the incomplete user-provisioned routes. Instead, conventional systems may resort to typical protection paths, which may not offer optimal routing. Also, conventional systems do not normally offer a process to automatically reserve home route resources when a home route changes. Since it would normally be done manually, this may cause multiple hits and defeat a desired home path. Therefore, there is a need in the field of path computation to retain home path resources on changing home routes as much as possible.

BRIEF SUMMARY

The present disclosure is directed to systems, methods, and non-transitory computer-readable media for performing functions for managing or controlling a network with respect to path computation. One method, according to one implementation, includes a step of receiving information regarding a path through a network from a source node via one or more intermediate nodes to a destination node, the path loosely defined by a user as a partially-completed route through the network using one or more network resources. The method also includes a step of utilizing the information regarding the path to automatically compute a completed home route from the source node to the destination node while attempting to retain as many of the one or more intermediate nodes of the path as possible.

In some implementations, the method may also include the step of causing the source node to send a setup message to reserve the one or more network resources of the one or more intermediate nodes along the home route. For example, the one or more network resources may include one or more network elements, one or more links connecting adjacent network elements, and spectral bandwidth for enabling packets to be transmitted through the one or more network elements and one or more links. Each of the network elements, for example, may be a node, a router, a switch, or the like.

In response to one or more network elements being added or deleted along the partially-completed route through the network, the method may also include creating alternate home routes while attempting to retain as many of the one or more intermediate nodes of the path as possible. In response to detecting a fault in one of the one or more network resources, the method may include detecting and switching to an alternate home route to bypass the fault. In response to detecting a fault in one of the one or more network resources, the method may alternatively include computing an alternate route from a last connected node to a next intended node in the complete route to bypass the fault.

The method may be embedded in a system that is incorporated in a control plane of the network. Also, the home route may include a Designated Transit List (DTL). The step of automatically computing the completed home route may include performing a Traffic Engineering (TE) procedure using a Path Computation Engine (PCE) or Software-Defined Network (SDN) controller of a network management system at a head-end of a Label Switched Path (LSP) through a Multi-Protocol Label Switching (MPLS) network section.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
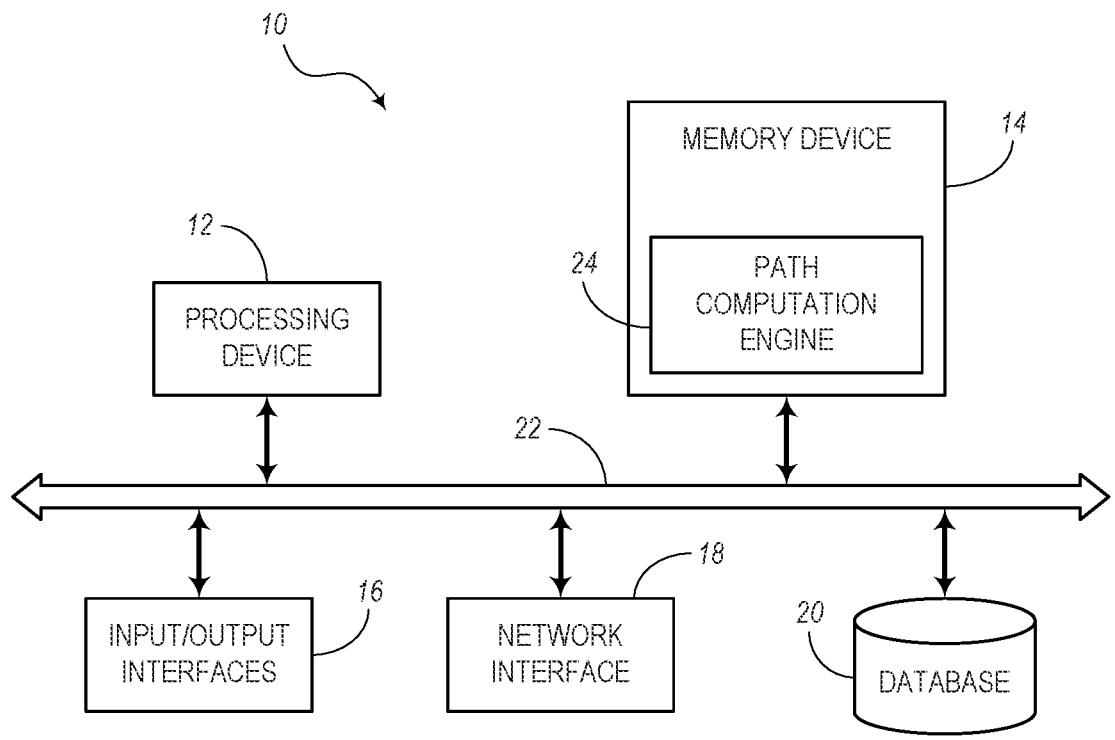
FIG. 1 is a block diagram illustrating a controller for computing paths and reserving network resources for enabling transmission along the paths, according to various embodiments of the present disclosure.

The present disclosure relates to systems and methods for automatically computing network routes while overcoming some of the deficiencies of conventional systems. Path computation, according to the embodiments of the present disclosure, may include automatically completing a partially-completed route that is configured by a user. Thus, a user may specify a source node and a destination node and may also specify one or more intermediate nodes through which packets are transmitted. The embodiments of the present disclosure may be configured to fill in the gaps to complete the route referred to herein as a "home route."

Also, the present embodiments enable a customer (user) to specify which portions of a home route are "loose" routes. A loose route, for example, may be a route that passes through two nodes, but the exact route from this first node to the next node is not specified. Once a home route is calculated from this first node to the next node and there is a failure along this loosely defined route, the systems and methods of the present disclosure may be configured to detect another loose home route that still goes through this first node and next node, but may take another path. This process of establishing another home route between two nodes is an option that can be provided to a user (e.g., network administrator) instead of a typical protection path, which may not include the designated nodes in the home route. This process, as described in the present disclosure, provide additional options to a user for defining routes and therefore provide greater flexibility with respect to path computation compared to conventional systems.

According to the present disclosure, some embodiments may include a process of keeping track of changes in a home route when nodes are added or deleted in between two specifically designated nodes in a home route. The systems and methods may include reserving resources on the home route and also on any newly changed home route. For example, the action of reserving resources may include reserving, booking, or designating one or more nodes in a path, reserving, booking, or designating spectrum, bandwidth, time slots, etc. (e.g., based on the system layer), reserving, booking, or designating links between nodes, etc. Thus, the present disclosure provides a solution to re-engineer the reserved bandwidth to retain home path resources that may be needed for a loosely-defined home route.

For example, this loosely-defined home route may be referred to herein as a Loose Home Route (LHR). LHR is a route where a user specifies portions or sections of a route from a source to a destination. This may be done as the user is only concerned with a route taking certain paths of the networks and wants the allow the automatic computation of the rest of the route within the user constraints. This allows a user to choose an option where the systems and methods of the present disclosure can determine routes while maintaining as much of a home route as possible, particularly when nodes and links are added or deleted in a particular section of a network that might be outside of the user's knowledge, jurisdiction, or concern.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a controller 10 for computing paths and reserving network resources for enabling transmission along the paths. According to some embodiments, the controller 10 may be part of a management or control system for enabling a network operator to operate in a control plane of a network to enact various controls on the network. In particular, the controller 10 may enable a user (e.g., network operator) to select different nodes through which packets are to be transmitted. Then, the controller 10 may automatically create a complete home route through the network passing through the specific sequence of nodes designated by the user.

As illustrated, the controller 10 may be a digital computing device that generally includes a processing device 12, a memory device 14, Input/Output (I/O) interfaces 16, a network interface 18, and a database 20. It should be appreciated that FIG. 1 depicts the controller 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the controller 10 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

The memory device 14 may include a data store, database (e.g., database 20), or the like, for storing data. In one example, the data store may be located internal to the controller 10 and may include, for example, an internal hard drive connected to the local interface 22 in the controller 10. Additionally, in another embodiment, the data store may be located external to the controller 10 and may include, for example, an external hard drive connected to the Input/Output (I/O) interfaces 16 (e.g., SCSI or USB connection). In a further embodiment, the data store may be connected to the controller 10 through a network and may include, for example, a network attached file server.

Software stored in the memory device 14 may include one or more programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 16 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 18 may be used to enable the controller 10 to communicate over a network, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network.

The controller 10 may be deployed in a network for operation in Layer 0, Layer 1, or any other layer in the Open Systems Interconnection (OSI) model, for loosely establishing a home route and attempting to retain as much of the home route as possible and/or for any other source-based routing strategies. The controller 10 may include a Path Computation Engine (PCE) 24 configured to compute paths or routes through a network. The PCE 24 may include traditional path computation functionality as well as additional features as described in the present disclosure that are configured to improve upon the traditional path computation functionality.

The PCE 24 may be implemented in any combination of software/firmware and hardware. The portions of the PCE 24 implemented as software/firmware may be stored in any suitable non-transitory computer-readable media, such as the memory device 14. When implemented in hardware, the PCE 24 may be embedded in the processing device 12 in ASIC or other suitable physical structure. The PCE 24 may include computer logic or program features having instructions that enable or cause the processing device 12 to perform certain path computation functionality, as described in the present disclosure.

In particular, the PCE 24 may be configured to instruct the processing device 12 to receive information regarding a home route through a network. For example, this home route may be loosely defined by a user as a partially-completed route through the network from a source node to a destination node via one or more network resources. Also, the PCE 24 may cause the processing device 12 to utilize the information regarding the home route to automatically compute a complete route from the source node to the destination node while attempting to retain as many of the one or more network resources of the home route as possible.

In some embodiments, the PCE 24 may be configured to enable the processing device 12 to instruct the source node to send a setup message to reserve the one or more network resources along the complete route. The one or more network resources, for example, may include Network Elements (NEs) and one or more links. Also, each of the NEs may be a node, a router, a switch, or other suitable component. In response to one or more network resources being added or deleted along the complete route in the network, the PCE 24 may provide instructions to the processing device 12 to enable the processing device 12 to modify the complete route.

In response to detecting a fault in one of the network resources, the PCE 24 may be configured to utilize a user-defined alternate route to bypass the fault. In response to detecting a fault in one of the network resources, the PCE 24 may further enable the processing device 12 to compute an alternate route from a last connected node to a next intended node in the complete route to bypass the fault.

According to some implementations, the home route may include a Designated Transit List (DTL). Also, the step of automatically computing the complete route may include performing a Traffic Engineering (TE) procedure using a Path Computation Engine (PCE) or Software-Defined Network (SDN) controller of a network management system or device at a head-end of a Label Switched Path (LSP) through a Multi-Protocol Label Switching (MPLS) network section. The home route may include a sequence of nodes in the network and may further include one or more links between adjacent pairs of network resources (e.g., nodes).

Figure 2:
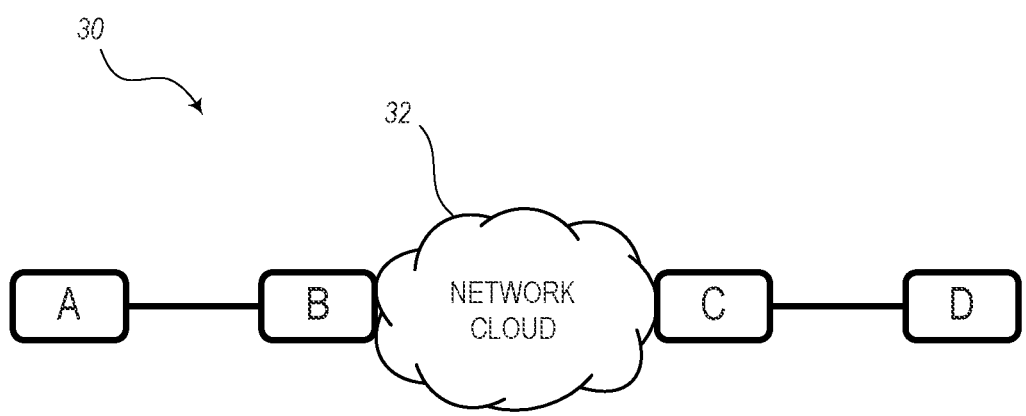
FIG. 2 is a diagram illustrating a section of a network in which a home route is planned, according to various embodiments.

FIG. 2 is a diagram illustrating a section of a network 30 in which a home route is planned. In this embodiment, the network 30 includes at least Node A, Node B, Node C, and Node D. Also, the network 30 includes a network cloud 32 between Nodes B and C. For example, the network cloud 32 could be a mesh network where nodes might be added or deleted or could simply be a direct connection or link between Node B and Node C. Particularly, the user may not necessarily need to or want to specify every single node in the path from Node B to Node C, particularly if the network cloud 32 may be changed over time.

As an example, suppose a user wishes to transmit packets from a source node (e.g., Node A) to a destination node (e.g., Node D). In this example, suppose the user provisions an incomplete route A-B . . . C-D, where the route specifically starts off by going directly from Node A to Node B and the route specifically ends by going from Node C to Node D. However, from Node B to Node C, the user may designate this portion of the route as a loose route. In other words, the user does not want to particularly define exactly how packets are communicated from Node B to Node C, but instead wants to allow the automatic path computation system (e.g., controller 10 utilizing the PCE 24) to automatically fill in the gap between Node B and Node C.

For example, there may be any number N of valid routes between Nodes B and C. The user is given a choice at this point to allow the PCE 24 of the present disclosure to calculate a home route from Node B and Node C. Then, if there are any issues along this loosely created home route, the PCE 24 may then calculate another home route from Node B to Node C to retain the A-B . . . C-D user-defined route. Therefore, even if there is a protection route from the source (Node A) to the destination (Node D) that goes around either Node B or Node C, the PCE 24 may be configured to detect another loosely-defined home path that includes both Node B and Node C to satisfy the user's wishes of retaining as much of the A-B . . . C-D route as possible. Therefore, after a first home route is calculated, the PCE 24 may perform a route validation process to determine if this first home route is maintained. If (or when) this initial home route becomes invalid (e.g., due to a fiber break, etc.), the PCE 24 can compute another valid home route through the network cloud 32 between Nodes B and C and complete the user-defined route.

In one example, there may be a single node (e.g., Node M, not shown) in the network cloud 32 connecting Nodes B and C. The PCE 24 may calculate the initial home route as A-B-M-C-D. If, for example, M is removed (or if there is a fiber break along B-M-C), the PCE 24 may search for another path through the network cloud 32 from Node B to Node C. For example, suppose that Nodes N and O (not shown) were added in the network cloud 32 connecting Nodes B and C, then the PCE 24 may compute a new home path that include the portion B-N-O-C. Also, if the PCE 24 determined that the faulty initial home path (including B-M-C) is restored (e.g., if a fault has been fixed, etc.), then the PCE 24 may switch back to this initial home path.

If A-B . . . C-D is the user-defined home route, the route validation by the PCE 24 may find N versions of this home route. This essentially means the home route can change while the service is on a protection route. The PCE 24 can retain each of the nodes (i.e., Nodes A, B, C, and D) in through any of the N versions and may continue to look for new home routes while retaining these nodes. In addition, the PCE 24 may also be configured to (or may work in conjunction with one or more related applications to) reserve or book the network resources (e.g., nodes, bandwidth, spectrum, optical channels, etc.) to retain the initial home route (while this path is being used) and also to reserve or book other resources as necessary when the initial home route is unavailable and the PCE 24 intends to switch to an alternate home route.

It may be noted that the embodiments of the present disclosure are intended to overcome some of the issues of the conventional systems. For example, the conventional routing strategies may enforce strict explicit routing based on nodes/links in user-provisioned routes. If any node/link is found missing/incomplete, it simply fails the user route instead of looking for an alternate route for missing/incomplete nodes/links. Thus, the conventional systems do not provide an option to automatically complete and validate the loosely-configured user-defined routes. However, the embodiments of the present disclosure are configured to provide ways to retain home path resources on changing home routes.

Figure 3:
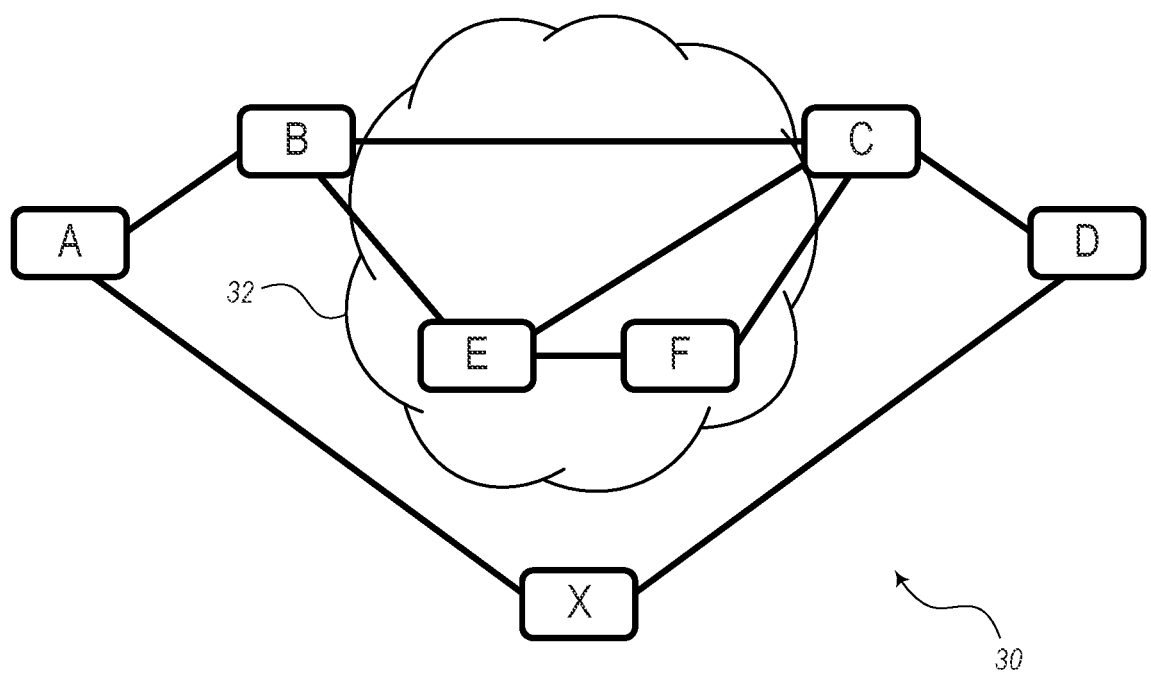
FIGS. 3 and 4 are diagrams illustrating another section of the network of FIG. 2 in which multiple routes are planned and utilized, according to various embodiments.

FIG. 3 shows a section of the network 30 of FIG. 2, whereby additional nodes are depicted. For example, in this embodiment, the network cloud 32 includes Nodes E and F. Also, the network cloud 32 include a direct path (e.g., B-C) from Node B to Node C, a path (B-E-C) from Node B to Node E to Node C, and another path (B-E-F-C) from Node B to Node E to Node F to Node C. Therefore, multiple loose routes may be planned and utilized from Node B to Node C.

Again, suppose that the user (e.g., network administrator) designates a loose route (or LHR) as A-B . . . C-D. The PCE 24 may compute a first (or initial) home route (HR1) as A-B-C-D, which in this example may be a preferred route using fewer resources. Also, suppose PCE 24 in this example compute a second home route (HR2) as A-B-E-C-D, which may be utilized if HR 1 is unavailable (e.g., due to a fault between Nodes B and C). Finally, suppose that PCE 24 also compute a third home route (HR3) as A-B-E-F-C-D, which may be utilized if HR1 and HR2 are unavailable (e.g., due to faults along HR1 and HR2).

Also, suppose that the user had previously defined a protection path that avoid the network cloud 32 altogether and include a Node X, whereby the protection path would be A-X-D. This protection path (P1) may be utilized when a fault is detected in the home route (e.g., HR1) and before any alternate home routes (e.g., HR2, HR3) are detected and/or before the resources along these alternate home routes have been reserved. Then, once these alternate home routes are detected and the resources have been reserved, the PCE 24 may then switch to one of these routes in order to retain the home path A-B . . . C-D according to the user's requests.

In some embodiments, next generation optical networks may include Reconfigurable Optical Add/Drop Multiplexers (ROADMs) deployed at the different nodes. For example, suppose Node B is a node in New York City and Node C is a node in New Jersey and that there are multiple Intermediate Line Amplifiers (ILAs) between Nodes B and C. Also, suppose that as a result of signal degradation between Nodes B and C, some of the ILAs are converted to ROADM sites. In this case, the PCE 24 may change the home route and may also change a Designated Transit List (DTL) since there would be more nodes in between Nodes B and C. In this case, the PCE 24 can perform the detection of loose routes as described in the present disclosure.

The PCE 24 may also automatically correct user routes, retain the home routes as much as possible, and reserve the resources on these established user routes. In some respects, this may speed the process for node insertions/deletions in a network where retaining home routes is enabled, as defined herein. The conventional control plane systems do not provide this type of flexibility to retain a loosely-defined home route.

Loose routing may be an extension of Control Plane Route Validation techniques, where, instead of failing (or giving up on) a user-provisioned incomplete route (e.g., due to faulty or missing links or nodes), the PCE 24 can find an implicit path from the last known connected node (e.g., Node B) to the next node (e.g., Node C) in the user provisioned route. Thus, the present disclosure provides a mechanism for retaining loosely-defined home routes that are provisioned by a user as incomplete routes.

The systems and methods of the present disclosure are configured to provide a way to retain home routes that are loosely (incompletely) defined. For example, the embodiments of the present disclosure may be utilized according to the below use-cases:

1. User provides certain sections in the network and expects the PCE 24 to compute the complete routes which must contain those user-defined sections.
2. User provides certain nodes in the network and expects the PCE 24 to compute complete routes connecting these nodes.
3. User provides certain regeneration (regen) nodes and expects the PCE 24 to compute complete routes connecting these regen nodes.
4. User performs a node insertion/deletion procedure affecting the user route and expects the PCE 24 to correct the user routes as needed.

With regard to the process of computing a Loose Home Route (LHR), the PCE 24 may be configured to perform the following actions:

1. During a Control Plane Home Route validation process, when the PCE 24 finds that a provisioned hop (e.g., link between two provisioned nodes) in the user route is not connected to the next hop node in the route, the PCE 24 tries to find the implicit route between the last connected node (e.g., Node B) to the next hop node (e.g., Node C) provisioned in the user route. Alternatively, a user may pick two nodes and then if there is a direct hop available, this link can be automatically "reserved." Otherwise, a route may be found from one node to the next in the user defined route.
2. The PCE 24 may connect an implicit route with the rest of the user-defined home route, complete the path computation for this route, and then defined this as a Loose Home Route (LHR). Thus, the LHR may be a combination of the hops provisioned in the user route and the implicit route found by the PCE 24.

One of the goals of the present embodiments is to retain the LHR as much as possible and provide a mechanism to clean-up or correct routes and reserve resources on the changing LHRs. With regard to the process of retaining the LHR, the PCE 24 may be configured to perform the following actions:

1. When a Sub-Network Connection (SNC) is created for the first time, the resources for retaining the LHR are reserved on the computed LHR.
2. On a periodic basis, the PCE 24 may perform a home route validation process. In this process, the PCE 24 may find a current LHR (e.g., HR1, which is A-B-C-D) to be invalid. In such a case, the PCE 24 may be configured to compute an alternate LHR (e.g., HR2, which is A-B-E-C-D).
3. When the first LHR (e.g., HR1) becomes invalid, an end-to-end RELEASE message is triggered from the head-end (e.g., Node A) of the route to release the resources on this route.
4. When the PCE 24 computes a new LHR (e.g., HR2), a SETUP message will be triggered from the head-end (e.g., Node A) to reserve the resources on this new home route.

Figure 4:
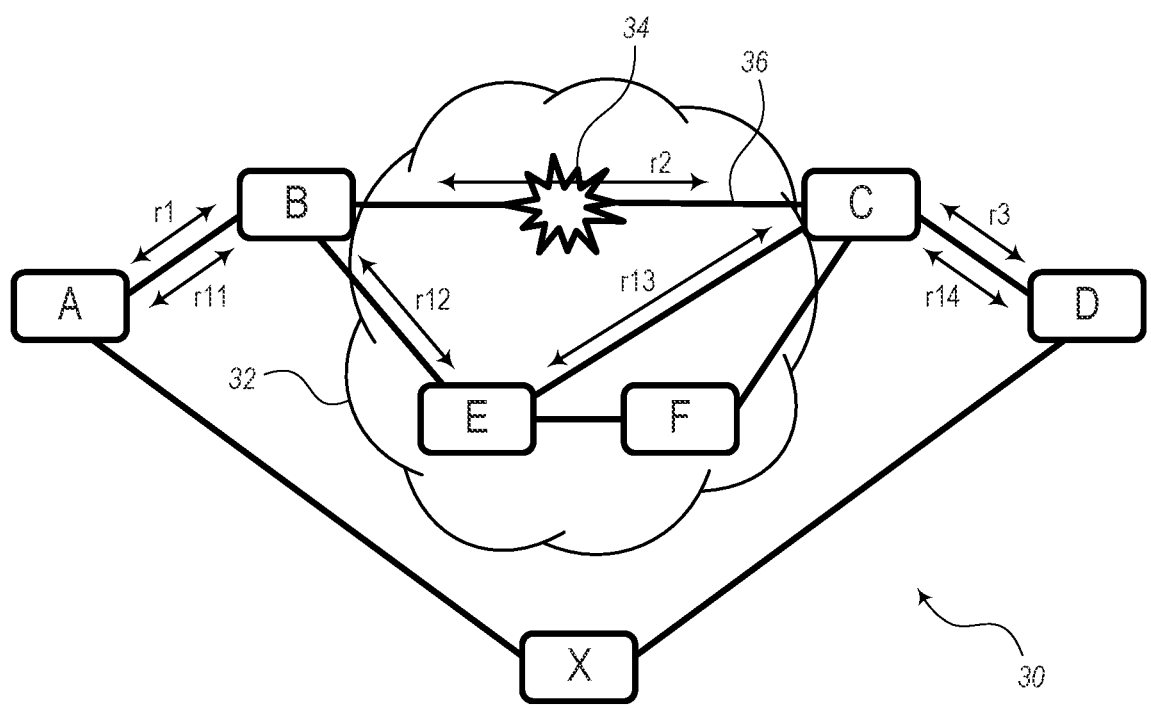

FIG. 4 is a diagram illustrating the section of the network 30 as shown in FIG. 3, whereby a failure 34 exists on a link 36 between Node B and Node C. With the failure 34 (e.g., fault, fiber break, disconnection, etc.), the first home route (i.e., HR1), which includes resources r1, r2, and r3 from Node A to Node D, is not available. Therefore, the PCE 24 is configured to find an alternate route. If no other home routes are known at that time, the PCE 24 may first switch to the protection route P1 (i.e., A-X-D). Then, the PCE 24 may attempt to find any home routes that retain the user-defined nodes including Node A, Node B, Node C, and Node D. For example, the PCE 24 may detect the home route (e.g., HR2) described above including nodes A, B, E, C, and D in that sequence. The route (HR2) includes resources r11 (or r1), r12, r13, and r14 (or r3). When this alternate home route is detected, the PCE 24 can reserve the resources (e.g., one or more nodes and one or more links) associated with HR2 and then switch to this route from the protection route P1. This enables the changing of loose home routes.

A RELEASE message is triggered on the old loose home route HR1, which releases old RHP resources (r1, r2, r3). Also, a SETUP message is triggered on new loose home route HR2 which reserves resources (r11, r12, r13, r14) on the new home route HR2.

Again, the SNC with the feature of retaining the loosely-defined home routes uses incomplete user route as a home route (e.g., HR1). On Home Route validation, the PCE 24 can compute three versions of the home route (e.g., HR1, HR2, HR3) for this user-define route.

When the failure 34 (e.g., fiber cut, fiber break, or other fault) happens on the link 36 (or B-C) between Nodes B and C, the PCE 24 utilized in the SNC can move to the protect route P1 (i.e., A-X-D). The PCE 24 (of the control plane) can periodically validate the home route to make sure HR1 is still available. If not, the PCE 24 can compute another version of the user-defined home route that simply includes Node B and Node C and is left undefined with respect to the rest of the network cloud 32. For example, the PCE 24 may compute HR2 (A-B-E-C-D) and HR3 (A-B-E-F-C-D) as potential alternate home routes. With failure 34, the PCE 24 changes the home rout from HR1 to a first preferred alternate route (e.g., HR2) and thereby bypasses the protection path P1.

With changes in the home routes, the old resources (r1, r2, r3) of HR1 are cleared and new resources (r11, r12, r13, r14) of HR2 are reserved or booked (or re-booked). This enables the systems and methods of the present disclosure to try to retain as much of the old HR (e.g., nodes and links) after the protection path P1 is used according to need.

In operation, the present disclosure overcomes some of the problems of the conventional solutions as it provides that:
1. No user intervention and time is required to provision the complete user routes.
2. The PCE 24 automatically corrects/completes the user route during validation of incomplete user routes.
3. There is no traffic impact due to tear down and regrooming of SNCs for retaining a new home path.
4. The PCE 24 clears the resources on the old loosely-defined home route end-to-end.
5. The PCE 24 finds a new loose home route and automatically reserves the resources on the newly established home route.
6. The process of reserving resources on the newly established loose home route, which may be stored in a DTL, is fast as compared to manual procedures. It is found to be faster, for example, because it does not involve preemption crank backs of old resources.

In some cases, the PCE 24 may receive a user request to create a loose connection between Nodes B and C. The PCE 24 may simply find a first home route (HR1) or perhaps this route is the only one available at that time. If the failure 34 is detected, this home route HR1 is no longer available and the PCE 24 has no other home route to switch to. In this case, the PCE 24 may switch to the protection route P1 (A-X-D) that bypasses Nodes B and C. While the service is continued through this protection route P1, the PCE 24 may be configured to search for other home routes through Nodes B and C. Before this time, the PCE 24 may not be aware that Nodes E and F have been newly added to the network cloud 32. After switching to P1, the PCE 24 may then find one or more alternate home routes (e.g., HR2, HR3) that retain the home route through Nodes B and C. Since Nodes E and F were never reserved or booked, the PCE 24 can then reserve Nodes E and F, links between various pairs of Nodes B, E, F, C, and resources associated with bandwidth, spectrum, channels, time slots, etc. (e.g., based on layer) for operation over HR2, HR3.

When (or if) the B-C link 36 is restored or recovered (i.e., when the failure 34 is removed), the PCE 24 may be configured to return to the initial home route HR1, which may be the preferred route. The reservation of Nodes E and F may be cleared at this time and the PCE 24 can successfully revert back to operation on HR1.

Figure 5:
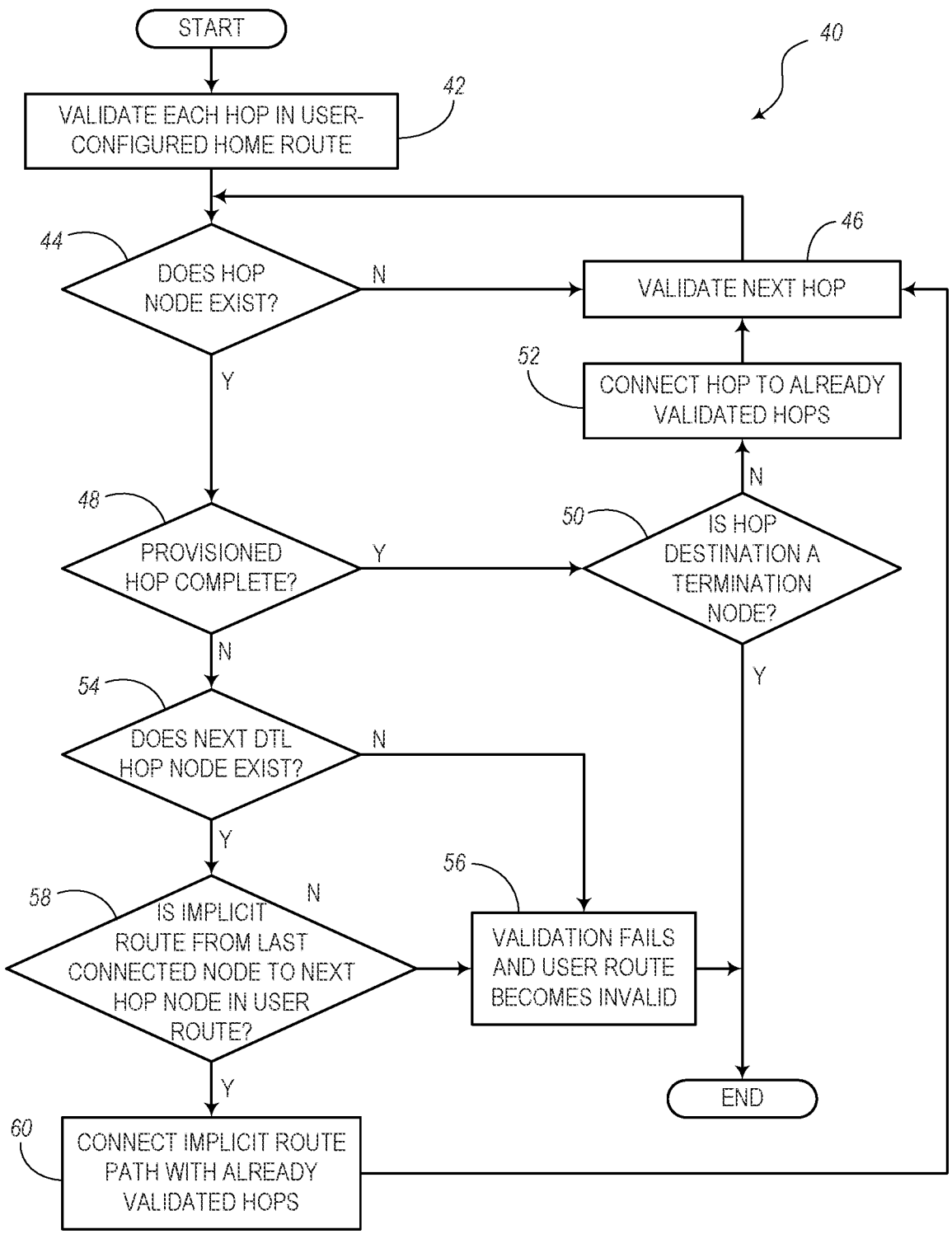
FIG. 5 is a flow diagram illustrating a process for performing path computation, according to various embodiments.

FIG. 5 is a flow diagram illustrating an embodiment of a process 40 for performing path computation. In some cases, the process 40 may include logical code or instructions of the PCE 24 stored in a non-transitory computer-readable medium (e.g., memory device 14), whereby the computer code or instructions may be configured to enable or cause the processing device 12 to execute certain functionality for performing path computation. As illustrated in the embodiment of FIG. 5, the process 40 includes a step of validating each hop in a user-configured home route, as indicated in block 42.

Condition block 44 includes the step of determining if the hop node exists. If not, the process 40 proceeds to block 46, which includes the step of validating the next hop and then returning back to the condition block 44. If it is determined in condition block 44 that the hop node does exist, the process 40 moves ahead to condition block 48.

Condition block 48 includes the step of determining if the provisioned hop is completed. If so, the process 40 goes to condition block 50. Otherwise, the process 40 goes to condition block 54. In condition block 50, it is determined whether the hop destination is a termination node. If so, the process 40 ends. If it is not the termination node, the process 40 goes to block 52, which includes the step of connecting a hop to the already validated hops then proceeding to block 46 to validate the next hop.

In condition block 54, the process 40 includes determining if the next Designated Transit List (DTL) hop node exists. If not, the process 40 goes to block 56. Otherwise, the process 40 goes to condition block 58. Block 56 includes the step of determining that the validating fails and that the user route has become invalid. After this step, the process 40 ends. Condition block 58 includes the step of determining if the implicit route from the last connected node to the next hop node is in the user route. If not, the process 40 goes to block 56 and then ends. If so, the process 40 proceeds to block 60, which includes the step of connecting an implicit route path with the already validated hops and then proceeding to block 46 to continue the process 40.

Figure 6:
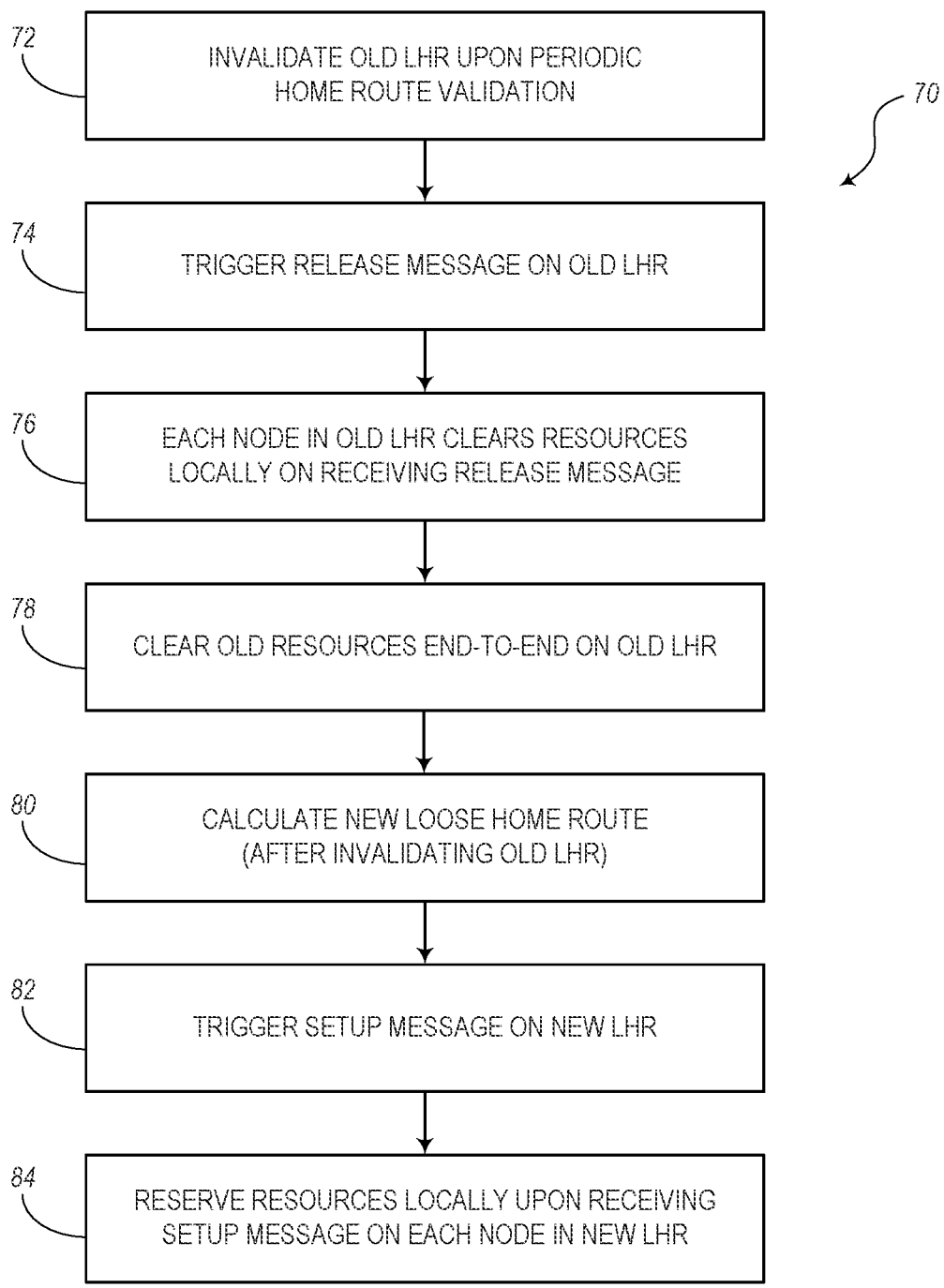
FIG. 6 is a flow diagram illustrating a process for changing a home route, according to various embodiments.

FIG. 6 is a flow diagram illustrating a process 70 for changing a loosely-defined home route. Again, this process 70 may be performed by the PCE 24 shown in FIG. 1. In the embodiment illustrated in FIG. 6, the process 70 includes invalidating an old Loose Home Route (LHR) based on results of a periodic home route validation procedure, as indicated in block 72. The process 70 further includes block 74, 76, 78 associated with functions associated with the old LHR. Block 74 includes the step of triggering a RELEASE message on the old LHR. For each node in the old LHR, block 76 includes the step clearing the resources locally upon receiving the RELEASE message. Block 78 includes the step of clearing the old resources end-to-end on the old LHR.

Blocks 80, 82, 84, 86 are related to establishing a new LHR after the old one has been cleared. In some embodiments, the steps associated with releasing the old LHR (e.g., blocks 72, 74, 76, 78) may be performed in parallel with the steps associated with establishing the new LHR (e.g., blocks 80, 82, 84, 86). Block 80 includes the step of calculating a new LHR (e.g., after invaliding the old LHR). Block 82 includes the step of triggering a SETUP message on the new LHR. Upon receiving the SETUP message, block 84 includes the step of reserving the respective resources locally on each node in the new LHR.

Figure 7:
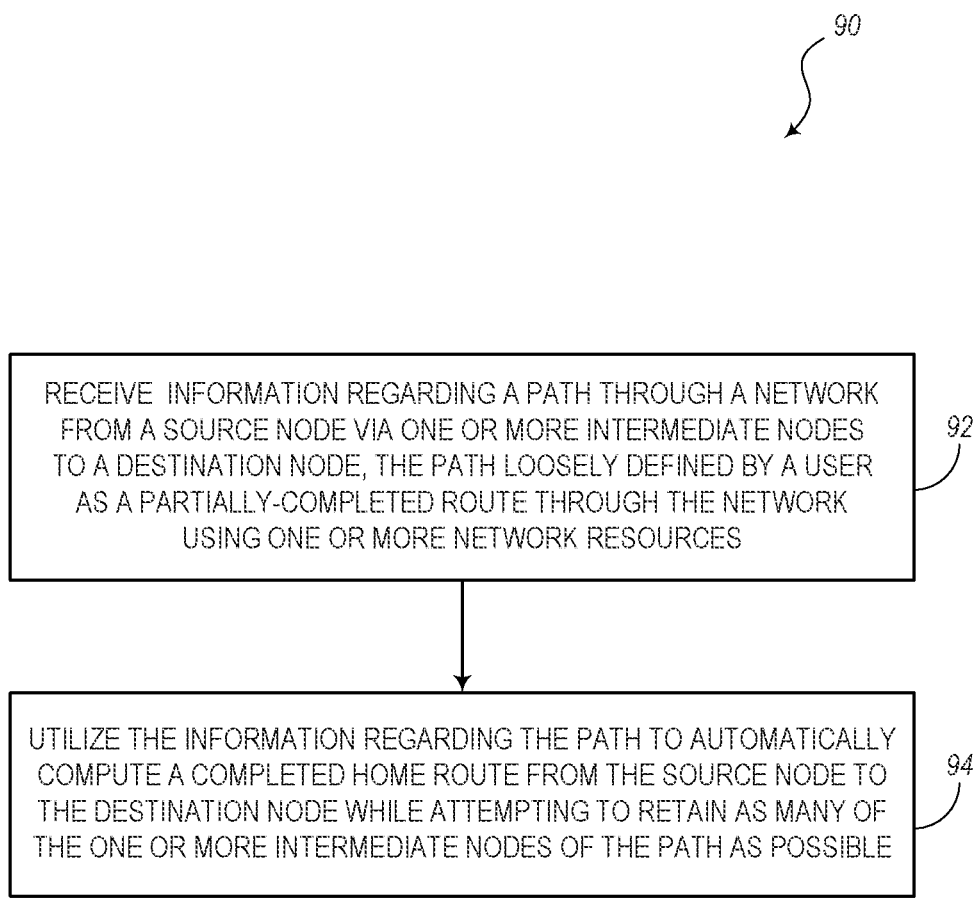
FIG. 7 is a flow diagram illustrating a general process for performing path computation, according to various embodiments of the present disclosure.

FIG. 7 is a flow diagram showing a generalized process 90 for performing path computation according to some embodiments of the present disclosure. As illustrated, the process 90 includes the step of receiving information regarding a path through a network from a source node via one or more intermediate nodes to a destination node, as indicated in block 92. In particular, the path is loosely defined by a user as a partially-completed route through the network using one or more network resources. Also, as indicated in block 94, the process 90 includes the step of utilizing the information regarding the path to automatically compute a completed home route from the source node to the destination node while attempting to retain as many of the one or more intermediate nodes of the path as possible.

According to additional embodiments, the process 90 may further include sending a SETUP message from the source node to reserve the one or more network resources of the one or more intermediate nodes along the home route, which may include spectral bandwidth, channels, etc. and/or links and other physical resources. Also, the one or more network resources may include one or more network elements, one or more links connecting adjacent network elements, and spectral bandwidth for enabling packets to be transmitted through the one or more network elements and one or more links. For example, each of the network elements may be a node, a router, a switch, or the like. In response to one or more network elements being added or deleted along the partially-completed route through the network, the process 90 may further include creating alternate home routes while attempting to retain as many of the one or more intermediate nodes of the path as possible.

In response to detecting a fault in one of the one or more network resources, the process 90 may include detecting an alternate home route and switching to this alternate home route in order to bypass the fault. In response to detecting a fault in one of the one or more network resources according to some embodiments, the process 90 may include the step of computing an alternate route from a last connected node to a next intended node in the complete route to bypass the fault.

In some embodiments, the process 90 may be performed by a system (e.g., controller 10) having a processor (e.g., processing device 12) and memory (e.g., memory device 14), where the memory includes instructions for enabling the processor to perform path computation techniques as described in the present disclosure. This system may be incorporated in a control plane of the network. Also, according to various embodiments, the home route may include a Designated Transit List (DTL). In some embodiments, the step of automatically computing the completed home route (e.g., block 94) may further include performing a Traffic Engineering (TE) procedure using a Path Computation Engine (PCE) or Software-Defined Network (SDN) controller of a network management system at a head-end of a Label Switched Path (LSP) through a Multi-Protocol Label Switching (MPLS) network section.

One of the goals of the embodiments described in the present disclosure is to allow a user or operator to designate a Loose Home Route (LHR) in a cloud and designate two or more points (including source and node points). Then, in response to receiving this user-entered information, the controller (in the control plane), such as the PCE 24, is configured to establish and manage a current home path (e.g., initial home path HR1), and then changing it to an alternate home path (e.g., HR2) when there is a failure on the current home path HR1, or when there new nodes added or old nodes removed from the loosely-defined portion of the path. The controller, for example, may be implemented on any layer in the network (e.g., Layer 0, Layer 1, or other source-based layer) in any suitable product.

Therefore, the present disclosure describes processes for reserving or booking home route resources on loosely-defined routes even if the "loose" route gets modified. Thus, the loose route provides resiliency and does not require user interaction, since the systems and methods (e.g., PCE 24) can automatically reserve and switch to an alternate path keeping many or all of the same network elements from the originally-designated network elements defined by the user.

Also, the present disclosure allows the retaining of the home routes as much as possible and allows a loose route definition to enable resources to inter-operate with each other. The PCE 24 can guard the retained home route principle even when there are changes to the loosely-defined routes. The present systems and methods provide a way to automatically follow the changes in a home route (or associated with the home route) and dynamically reserve and un-reserve (clear) these resources according to need. Thus, the systems and methods provide a unique solution to reserve/book resources even when routes are changed.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
    a processing device, and
    a memory device configured to store a computer program having instructions that, when executed, enable the processing device to
        receive information regarding a path through a network from a source node via one or more intermediate nodes to a destination node, the path is defined in the information as a home route through the network using one or more network resources with the home route including the source node, the destination node, and the one or more intermediate nodes, and
        utilize the information regarding the path to automatically compute an alternate home route for the home route, wherein the alternate home route is computed from the source node to the destination node while attempting to retain as many of the one or more intermediate nodes of the path as possible and wherein the alternate home route is utilized to protect the home route in response to a fault while retaining as much of the home route as possible.

2. The system of claim 1, wherein the instructions further enable the processing device to cause the source node to send a setup message to reserve the one or more network resources of the one or more intermediate nodes along the home route.

3. The system of claim 2, wherein the one or more network resources include one or more network elements, one or more links connecting adjacent network elements, and spectral bandwidth for enabling packets to be transmitted through the one or more network elements and one or more links, and wherein each of the network elements is a node, a router, or a switch.

4. The system of claim 1, wherein, in response to one or more network elements being added or deleted along the home route through the network, the instructions further enable the processing device to create one or more additional alternate home routes while attempting to retain as many of the one or more intermediate nodes of the path as possible.

5. The system of claim 1, wherein the steps include detecting a fault in one of the one or more network resources and, in response to the detecting, switching to the alternate home route to bypass the fault.

6. The system of claim 1, wherein, in response to detecting a fault in one of the one or more network resources, the instructions further enable the processing device to compute the alternate route from a last connected node to a next intended node in the home route to bypass the fault.

7. The system of claim 1, wherein the system is incorporated in a control plane of the network where the control plane manages one or more of layer 0 resources and layer 1 resources.

8. The system of claim 1, wherein the home route and the alternate home route each are specified by a Designated Transit List (DTL).

9. The system of claim 1, wherein automatically computing the alternate home route includes performing a Traffic Engineering (TE) procedure using a Path Computation Engine (PCE) or Software-Defined Network (SDN) controller of a network management system at a head-end of a Label Switched Path (LSP) through a Multi-Protocol Label Switching (MPLS) network section.

10. A non-transitory computer-readable medium configured to store computer logic having instructions that, when executed, cause one or more processing devices to:
receive information regarding a path through a network from a source node via one or more intermediate nodes to a destination node, the path is defined in the information as a home route through the network using one or more network resources with the home route including the source node, the destination node, and the one or more intermediate nodes, and
utilize the information regarding the path to automatically compute an alternate home route, wherein the alternate home route is computed from the source node to the destination node while attempting to retain as many of the one or more intermediate nodes of the path as possible and wherein the alternate home route is utilized to protect the home route in response to a fault while retaining as much of the home route as possible.

11. The non-transitory computer-readable medium of claim 10, wherein the instructions further cause the one or more processing devices to cause the source node to send a setup message to reserve the one or more network resources of the one or more intermediate nodes along the home route.

12. The non-transitory computer-readable medium of claim 11, wherein the one or more network resources include one or more network elements, one or more links connecting adjacent network elements, and spectral bandwidth for enabling packets to be transmitted through the one or more network elements and one or more links, and wherein each of the network elements is a node, a router, or a switch.

13. The non-transitory computer-readable medium of claim 10, wherein, in response to one or more network elements being added or deleted along the home route through the network, the instructions further cause the one or more processing devices to create one or more additional alternate home routes while attempting to retain as many of the one or more intermediate nodes of the path as possible.

14. The non-transitory computer-readable medium of claim 10, wherein the non-transitory computer-readable medium is incorporated in a control plane of the network where the control plane manages one or more of layer 0 resources and layer 1 resources.

15. The non-transitory computer-readable medium of claim 10, wherein the home route and the alternate home route are specified by a Designated Transit List (DTL).

16. The non-transitory computer-readable medium of claim 10, wherein automatically computing the alternate home route includes performing a Traffic Engineering (TE) procedure using a Path Computation Engine (PCE) or Software-Defined Network (SDN) controller of a network management system at a head-end of a Label Switched Path (LSP) through a Multi-Protocol Label Switching (MPLS) network section.

17. A method comprising the steps of:
receiving information regarding a path through a network from a source node via one or more intermediate nodes to a destination node, the path is defined in the information as a home route through the network using one or more network resources with the home route including the source node the destination node, and the one or more intermediate nodes, and
utilizing the information regarding the path to automatically compute an alternate home route for the home route, wherein the alternate home route is computed from the source node to the destination node while attempting to retain as many of the one or more intermediate nodes of the path as possible and wherein the alternate home route is utilized to protect the home route in response to a fault while retaining as much of the home route as possible.

18. The method of claim 17, further comprising the step of causing the source node to send a setup message to reserve the one or more network resources of the one or more intermediate nodes along the home route.

19. The method of claim 18, wherein the one or more network resources include one or more network elements, one or more links connecting adjacent network elements, and spectral bandwidth for enabling packets to be transmitted through the one or more network elements and one or more links, and wherein each of the network elements is a node, a router, or a switch.

20. The method of claim 17, wherein the steps include
detecting a fault in one of the one or more network resources and, in response to the detecting, switching to the alternate home route to bypass the fault;
wherein the alternate home route is from a last connected node to a next intended node in the home route to bypass the fault.

* * * * *